United States Patent
Strandjord et al.

(10) Patent No.: US 11,624,614 B1
(45) Date of Patent: Apr. 11, 2023

(54) REDUCING ROTATION SENSING ERRORS FROM LASER SOURCE SIGNAL AND MODULATION CROSS-TALK

(71) Applicant: Honeywell International Inc., Morris Plains, NJ (US)

(72) Inventors: Lee K. Strandjord, Tonka Bay, MN (US); Tiequn Qiu, Glendale, AZ (US); Glen A. Sanders, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 329 days.

(21) Appl. No.: 16/984,855

(22) Filed: Aug. 4, 2020

(51) Int. Cl.
   *G01C 19/72* (2006.01)
   *G01C 19/66* (2006.01)

(52) U.S. Cl.
   CPC ......... *G01C 19/727* (2013.01); *G01C 19/661* (2013.01)

(58) Field of Classification Search
   CPC .................... G01C 19/661; G01C 19/727
   See application file for complete search history.

(56) References Cited

U.S. PATENT DOCUMENTS

| | | | |
|---|---|---|---|
| 5,781,300 A * | 7/1998 | Strandjord | G01C 19/72 356/460 |
| 8,213,019 B2 | 7/2012 | Strandjord et al. | |
| 9,115,994 B2 | 8/2015 | Strandjord et al. | |
| 9,121,708 B1 | 9/2015 | Qiu | |
| 9,170,108 B1 | 10/2015 | Qiu et al. | |
| 9,354,064 B2 | 5/2016 | Strandjord et al. | |
| 9,389,081 B1 | 7/2016 | Strandjord et al. | |
| 9,683,846 B2 | 6/2017 | Strandjord et al. | |
| 9,772,189 B2 | 9/2017 | Strandjord et al. | |
| 10,175,047 B2 | 1/2019 | Sanders et al. | |
| 2019/0212148 A1 * | 7/2019 | Sanders | G01C 19/721 |

FOREIGN PATENT DOCUMENTS

| | | |
|---|---|---|
| CN | 102506896 A | 6/2012 |
| CN | 106848827 A | 6/2017 |

OTHER PUBLICATIONS

European Patent Office, "Extended European Search Report from EP Application No. 21172777.1", from Foreign Counterpart to U.S. Appl. No. 16/984,855, filed Oct. 15, 2021, pp. 1 through 8, Published: EP.

* cited by examiner

Primary Examiner — Michael A Lyons
(74) Attorney, Agent, or Firm — Fogg & Powers LLC

(57) ABSTRACT

Systems and methods for reducing rotation sensing errors from laser source signal and modulation cross-talk are provided herein. An RFOG includes a fiber optic resonator; a first laser source that produces a first light wave at a first carrier frequency and a first cross-talked portion at a second carrier frequency wave for propagating in a first direction, wherein a second cross-talked portion propagates in a second direction that is opposite to the first direction; a second laser source that produces a second light wave for propagating in the second direction at a second carrier frequency, and having a third cross-talked portion that propagates in the first direction, a first modulator that modulates the first light wave by suppressing light at the first carrier frequency and the second cross-talked portion at the second carrier frequency, and photodetectors that generate signals from the modulated first light wave and the second light wave.

20 Claims, 8 Drawing Sheets

REDUCING ROTATION SENSING ERRORS FROM LASER SOURCE SIGNAL AND MODULATION CROSS-TALK

STATEMENT REGARDING FEDERALLY SPONSORED RESEARCH OR DEVELOPMENT

This invention was made with Government support under FA9453-18-C-0045 awarded by AFRL. The Government has certain rights in the invention.

BACKGROUND

Gyroscopes (also referred to herein as gyros) have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counterclockwise (CCW) direction along the core of the optical fiber. Many FOGs utilize glass-based optical fibers that guide light along a solid glass core of the fiber. The two counterpropagating (e.g., CW and CCW) beams experience different pathlengths while propagating around a rotating closed optical path, and the difference in the two pathlengths is proportional to the rotational rate that is normal to the enclosed area.

In a resonator fiber optic gyroscope (RFOG), the counterpropagating light beams are typically highly coherent and circulate through multiple turns of the fiber optic coil and for multiple passes through the coil using a device, such as a fiber coupler, that redirects a portion of the light that has passed through the coil back into the coil again (i.e., circulates the light). The beam generating device modulates and/or shifts the frequencies of each of the counterpropagating light beams so that the resonance frequencies of the resonant coil may be observed. The resonance frequencies for each of the CW and CCW paths through the coil are based on a constructive interference condition, where all light-waves that traverse the coil a different number of times are in-phase or add constructively at any point in the coil. As a result of this constructive interference condition, an optical wave having a wavelength k is referred to as "on resonance" when the round-trip resonator optical pathlength is equal to an integral number of wavelengths. Rotation about the axis of the coil produces a different optical pathlength for clockwise and counterclockwise propagation, thus producing a shift between the respective resonance frequencies of the resonator. The frequency difference, measured by tuning the CW beam and CCW beam frequencies to match the resonance frequency shift of the closed optical path due to rotation, indicates the rotation rate.

In some embodiments, the RFOG may use a multifrequency laser source (MFLS) to provide laser light in the CW and CCW directions of the resonator. Frequently, size requirements, in some navigation grade gyro applications, may call for very small MFLSs. Typically, to meet the size requirements (and cost constraints), an MFLS may be made using a silicon photonics (SiP) chip, which can capably pack multiple optical functions onto a small silicon chip.

SUMMARY

Systems and methods for reducing rotation sensing errors from laser source signal and modulation cross-talk are provided herein. In certain embodiments, a resonator fiber optic gyroscope (RFOG) includes a fiber optic resonator. The RFOG also includes a first laser source that produces a first light wave at a first carrier frequency and a first cross-talked portion at a second carrier frequency wave for propagating within the fiber optic resonator in a first direction, wherein a second cross-talked portion propagates in a second direction that is opposite to the first direction. Further, the RFOG includes a second laser source that produces a second light wave for propagating within the fiber optic resonator in the second direction at a second carrier frequency, and having a third cross-talked portion that propagates in the first direction. Additionally, the RFOG includes a first modulator that modulates the first light wave by suppressing light at the first carrier frequency and the second cross-talked portion at the second carrier frequency. Moreover, the RFOG includes one or more photodetectors that generate a carrier suppressed first signal from the modulated first light wave and a second signal from the second light wave.

DRAWINGS

Understanding that the drawings depict only some embodiments and are not, therefore, to be considered limiting in scope, the exemplary embodiments will be described with additional specificity and detail using the accompanying drawings, in which.

Per common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made.

Systems and methods for reducing rotation sensing errors from laser source signal and modulation cross-talk are provided herein. Sensing errors may occur when modulation or other signals cross-talk from either the CW light wave into the CCW light wave or vice versa. Additionally, sensing errors may occur when optical signals cross-talk due to backscatter within a resonator towards the origin or cross-talk may occur before the signals enter the resonator. The cross-talk optical signals may interfere with the primary light wave. A system may apply at least one optical phase module to either or both CW or CCW light wave after the signal and/or modulation cross-talk has occurred to account for the adverse effects of the cross-talk. Further, the amplitude of the optical phase modulation may be set to suppress signals at the carrier frequency of the light wave, such that the suppressed signals have substantially zero power at the suppressed carrier frequency. Accordingly, when the light wave with the cross-talk modulation or optical signal backscatters in a gyroscope resonator, the interference with the primary light wave will not be at baseband but rather at the carrier suppression frequency and higher. Thus, the resulting gyroscope sensing may be at a sufficiently high frequency to be filtered out.

Figure 1:
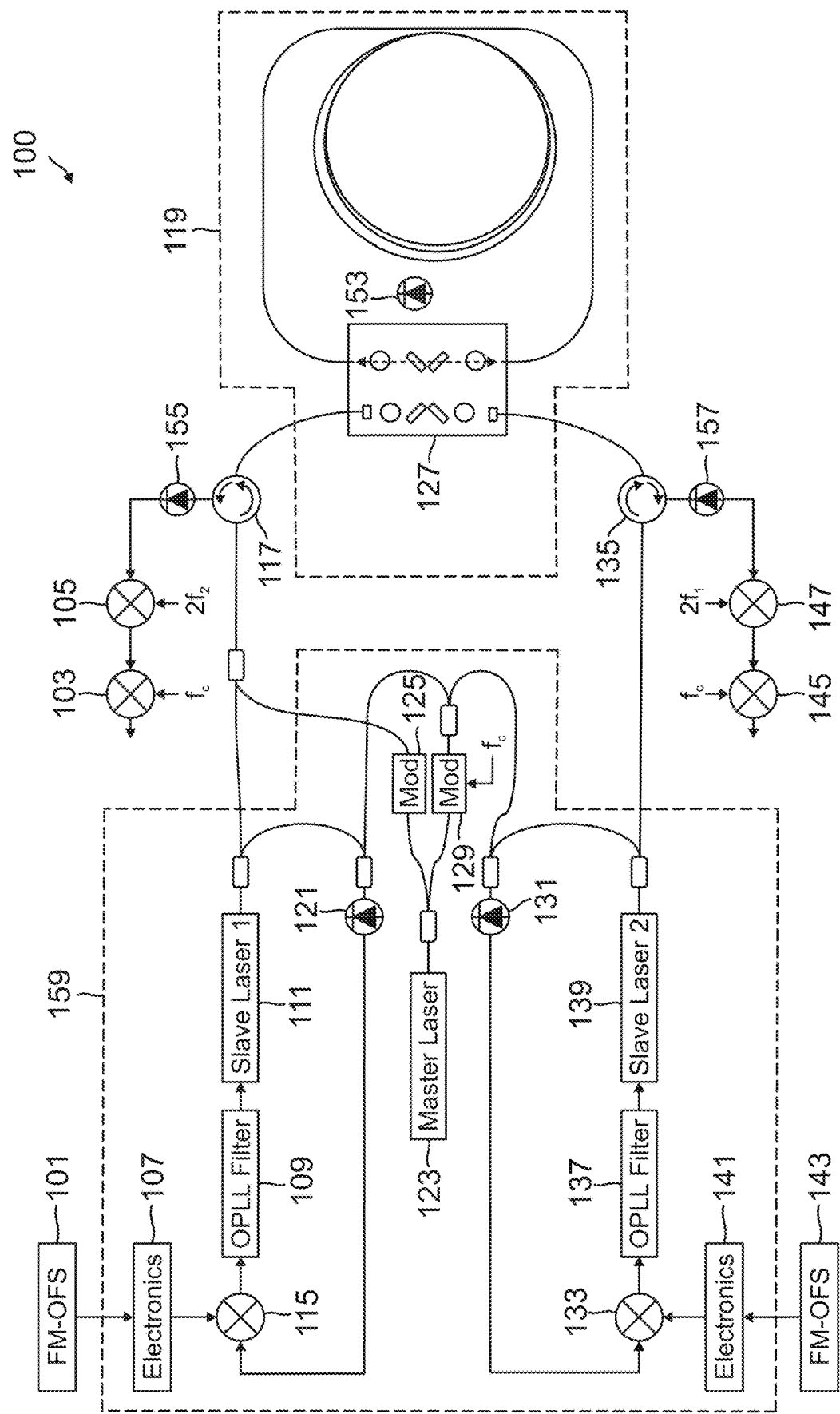
FIG. 1 is a block diagram illustrating a resonant fiber optic gyroscope (RFOG) according to an aspect of the present disclosure.

FIG. 1 is a block diagram illustrating a resonant fiber optic gyroscope (RFOG) 100, that uses a laser produced by a master laser source 123 to stabilize lasers produced by multiple slave laser sources 111 and 139 for propagation within a resonator 119. The RFOG 100 may function as part of a navigation system, a platform stabilization system, a pointing system, and the like. For example, in some embodiments, the RFOG 100 is implemented as part of an inertial sensor unit that includes one or more RFOGs and one or more linear accelerometers. The RFOG 100 may measure rotation rate and may provide rotation information as a signal indicative of the rotation rate. The measured rotation rate from the RFOG 100 may be provide rotation information to a processor through an interface. The processor, or other computational device, may use the rotation information when calculating navigation information that may include parameters such as position, orientation, and angular velocity. Additionally, the calculated parameters may be used to calculate data to be included in control signals that are provided to one or more optional actuators for controlling the operation of the actuators.

Further, in at least one implementation, the RFOG 100 includes transmission and reflection mode feedback control. In some implementations, components of the RFOG 100 that provide transmission and reflection mode feedback control may be fabricated on a silicon optical bench 127. The silicon optical bench may a surface used to mount aligned optical components. To provide transmission and reflection mode feedback control, light waves from the laser sources 123, 111, and 139 may circulate through the resonator 119. The light waves may be coupled into the resonator 119 through ports located on the silicon optical bench 127 such that the light waves propagate within the resonator 119. In at least one implementation, the silicon optical bench 127 may include a series of mirrors and couplers that reflect the light waves for coupling into the resonator 119. Alternatively, the RFOG 100 may include components other than the silicon optical bench 127 for coupling light waves into the resonator 119. For example, the RFOG 100 may include a fiber optic coupler, a waveguide, a waveguide coupler, or other suitable components for coupling light into the resonator 119.

In some embodiments, ports located on the silicon optical bench 127 may function as both input ports and output ports. For example, the ports located on the silicon optical bench 127 may couple light waves into the resonator 119 in a first direction (e.g., clockwise) and out of the resonator 119 in a second direction that is opposite to the first direction (e.g., counterclockwise). Similarly, other ports located on the silicon optical bench 127 may couple light waves into the resonator 119 in the second direction and out of the resonator 119 in the first direction. In alternative implementations, the resonator 119 may have separate input ports and output ports located on the silicon optical bench 127, on separate silicon optical benches, on separate components, or some combination thereof.

In some embodiments, light waves coupled into the resonator 119 have a "transmission port" and a "reflection port." In general, the light waves detected at a transmission port propagated through the resonator 119. The light waves detected at the reflection port include combinations of light waves incident on the resonator 119 that did not enter the resonator 119 and light waves that propagated through the resonator 119. For example, the photodetectors 155 and 157 may detect light waves emitted through the transmission ports and respectively circulated to the photodetectors 155 and 157 through circulators 117 and 135, while the photodetector 153 may detect light waves that are emitted through the reflection port. The reflection port photodetector 153 typically has a larger bandwidth than the transmission port photodetectors 155 and 157.

In certain implementations, light waves that are coupled into the resonator 119 are frequency stabilized using the resonator 119 with feedback control based on light waves acquired from the transmission ports on the silicon optical bench 127. Further, in certain implementations where light waves produced by a master laser source 123 are further used to stabilize the frequency of the light waves propagating within the resonator 119, light waves may also be detected by the photodetector 153 through the reflection port. Using feedback control, light waves that propagate within the resonator 119, may be stabilized, at both high and low frequencies. Thus, stabilization over a wide bandwidth may be achieved.

As described above, feedback control may be performed on the light waves acquired through the transmission ports. For example, light waves propagating in the CCW direction through the resonator 119 may be incident on the photodetector 155. The photodetector 155 may then convert the light waves into electrical signals. After converting the light waves into electrical signals, the photodetector 155 may provide the electrical signals to a series of demodulators. For example, the electrical signal may be provided to a sideband heterodyne demodulator 105 and a common demodulator 103. The sideband heterodyne demodulator 105 may demodulate the electrical signal using a sideband demodulation signal having a frequency that is twice a sideband heterodyne modulation frequency. A sideband signal having a sideband heterodyne modulation frequency is provided to a sideband heterodyne modulator. The sideband heterodyne modulator may use the sideband signal to modulate the slave laser beams to facilitate the discrimination of the different slave laser beams from one another during signal processing based on the sidebands of each laser beam. The common demodulator 103 may receive a common modulation frequency signal to demodulate the electrical signal produced by the photodetector 155 by a common modulation frequency. The common modulation frequency may be a common modulation frequency signal that is applied to the different light waves propagating within the resonator 119 that affects all the separate light waves that propagate through the resonator 119 such that the light waves are modulated at a common modulation frequency thus applying modulation imperfections in common to all of the light waves.

Similarly, feedback control may be performed on the light waves propagating in the CW direction. For example, light waves propagating in the CW direction through the resonator 119 may be incident on the photodetector 157. The photodetector 157 may then convert the light waves into electrical signals. After converting the light waves into electrical signals, the photodetector 157 may provide the electrical signals to a series of demodulators. For example, the electrical signal may be provided to a sideband heterodyne demodulator 147 and a common demodulator 145. The sideband heterodyne demodulator 147 may demodulate the electrical signal using a sideband demodulation signal having a frequency that is twice a sideband heterodyne modulation frequency. The common demodulator 145 may demodulate the electrical signal produced by the photodetector 155 by a common modulation frequency in a similar manner to the common demodulator 103.

The demodulated signals may be received by one or more processors through an interface. The processors may use the signals to adjust the frequency of the CCW and CW propagating light waves to be at a resonance frequency for the resonator 119. Also, the processors may use the signals to calculate a rotation information for the RFOG 100 and navigation information for an associated system. As used herein, one or more processors, such as a processing unit or other computational device, used in the present system and methods to process signals and measurements may be implemented using software, firmware, hardware, circuitry, or any appropriate combination thereof. The one or more processors may be supplemented by, or incorporated in, specially-designed application-specific integrated circuits (ASICSs) or field programmable gate arrays (FPGAs). The one or more processors may also include or function with software programs, firmware, or other computer-readable instructions for carrying out various process tasks, calculations, and control functions used in the present methods and systems.

Instructions for carrying out the various process tasks, calculations, and generation of other data used in the processing of data and signals produced during the operation of the methods described herein can be implemented in software, firmware, or other computer-readable instructions. These instructions are typically stored on any appropriate computer program product that includes a computer-readable medium used for storage of computer-readable instructions or data structures. Such a computer-readable medium can be any available media that can be accessed by a general-purpose or special-purpose computer or processor or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

In some embodiments, to control the CCW frequency, the one or more processors may control a frequency modulated offset frequency source (FM-OFS) 143. The FM-OFS 143 may produce a frequency signal that is used to demodulate a feedback signal produced by a photodetector 131. The photodetector 131 detects the light waves produced by the second slave laser source 139 and the master laser source 123. In some embodiments, electronics 141 may be used to prepare the signal produced by the FM-OFS 143 for demodulation of the feedback signal with a mixer 133. When the feedback signal is demodulated by the mixer 133, an optical phase lock loop filter 137 may filter the signal such that the signal can drive the second slave laser source 139 at a desired optical frequency associated with a resonance frequency of the resonator 119. As described above, a highly stable multi-frequency laser source (MFLS) 159 may produce the second slave laser.

To control the CW frequency, the processor may control a FM-OFS 101. The FM-OFS 101 may produce a frequency signal that is used to demodulate a feedback signal produced by a photodetector 121. The photodetector 121 detects the light waves produced by the first slave laser source 111 and the master laser source 123. In some embodiments, electronics 107 may be used to prepare the signal produced by the FM-OFS 101 for demodulation of the feedback signal with a mixer 115. When the feedback signal is demodulated by the mixer 115, an optical phase lock loop filter 109 may filter the signal such that the signal can drive the first slave laser source 111 at a desired optical frequency associated with a resonance frequency of the resonator 119. As described above, the highly stable MFLS 159 may produce the first slave laser.

In some embodiments, the photodetector 153 that senses light from the reflection port may be associated with master light waves generated by a master laser source 123. The response to changes in relative frequency between light produced by a laser source and resonance frequency within the resonator 119 is much faster at the reflection port than one of the transmission ports. To stabilize the master light waves produced by the master laser source 123 and, thus reduce the relative phase noise between the master light waves produced by the master laser source 123 and a resonance frequency at the resonator 119, the light waves produced by the master laser source 123 may be locked onto a CW resonance of the resonator 119. Additionally, common modulators 125 and 129 may receive a common modulation frequency signal to modulate the master light waves at a common modulation frequency, such that the light waves modulated at the common modulation frequency are detected by the photodetectors 121 and 131. The common modulated light waves may be used to apply a common modulation frequency to the light waves produced by both the first slave laser source 111 and the second slave laser source 139.

In some embodiments, the RFOG 100 may be made from small components to reduce the footprint of the RFOG 100 and allow arrangements of the components within a small volume. However, arranging the electronics within a small volume increases the likelihood of unwanted signal and modulation cross-talk. For example, gyro sensing errors may arise due to cross-talk from modulation or other signals that cross-talk between CW and CCW light waves within the MFLS 159. Cross-talk that arises within the MFLS 159 may be referred to herein as "first cross-talk." Also, sensing errors may arise due to cross-talk that occurs when light waves backscatter within the resonator 119. Cross-talk due to backscattered light by the resonator 119 may be referred to herein as "second cross-talk."

Figure 2:
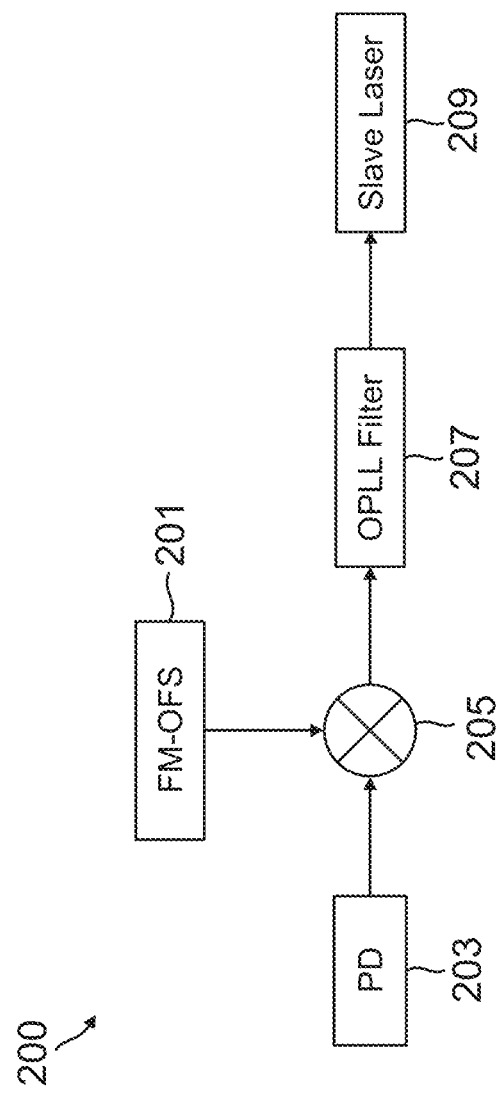
FIG. 2 is a block diagram illustrating an optical phase-locked loop response to a cross-talk tone on an OFS drive according to an aspect of the present disclosure.

FIG. 2 is a block diagram illustrating components of an optical phase-locked loop 200 having an OFS drive. As shown, the phase-locked loop may receive an electrical signal from the photodetector 203 that detects the light produced by a slave laser source 209. As described herein, the slave laser source 209 may function similarly to one of the first slave laser source 111 or the second slave laser source 139 described above in connection with FIG. 1. As shown, a mixer 205 may modulate a slave laser signal provided by the photodetector 203 with a signal from an FM-OFS 201, where the FM-OFS 201 functions similarly to either the FM-OFS 101 or the FM-OFS 143.

In certain implementations, the signal provided by the photodetector 203 may be simplified and approximated by the following equation (where the tones due to a first sideband heterodyne modulation may be shown to be insignificant to illustrate the main error mechanism):

$$V_1 \cos(\omega_{OFS\_1} t).$$

The signal from the photodetector 203 may be a beat note between the master laser and corresponding slave laser source 209. Additionally, the signal provided by the FM-OFS 201 may be approximated and represented by the following equation:

$$V_1 \sin(\omega_{OFS\_1} t) + \beta_{Xtalk2} V_2 \sin(\omega_{OFS\_2} t + \phi_{SHD2} \sin(\omega_{SHD2} t)).$$

As shown, the signal provided by the FM-OFS 201 may include the signal along with a cross-talk term that includes the offset and sideband heterodyne frequencies of the counterpropagating slave laser. After mixing with the signal from the photodetector 203, the cross-talked tones of the signal output of the mixer 205 may be represented as:

$$\frac{1}{2} A_{xtalk} \sin(\Delta\omega_{OFS} t) J_0(\phi_{SHD2}) + \frac{1}{2} A_{xtalk} J_1(\phi_{SHD2}) \sin((\Delta\omega_{OFS} + \omega_{SHD2}) t) - \frac{1}{2} A_{xtalk} J_1(\phi_{SHD2}) \sin((\Delta\omega_{OFS} - \omega_{SHD2}) t),$$

Where $\Delta\omega_{OFS}$ is equal to a change in frequency from the FM-OFS 201, $A_{Xtalk}$ is equal to the amplitude of the cross-talk, and $J_1$ is a Bessel function. This signal may then be used by the OPLL Filter 207 to drive the slave laser source 209, where the OPLL filter 207 functions in a similar manner to the OPLL filters 109 and 137 in connection with FIG. 1.

Figure 3:
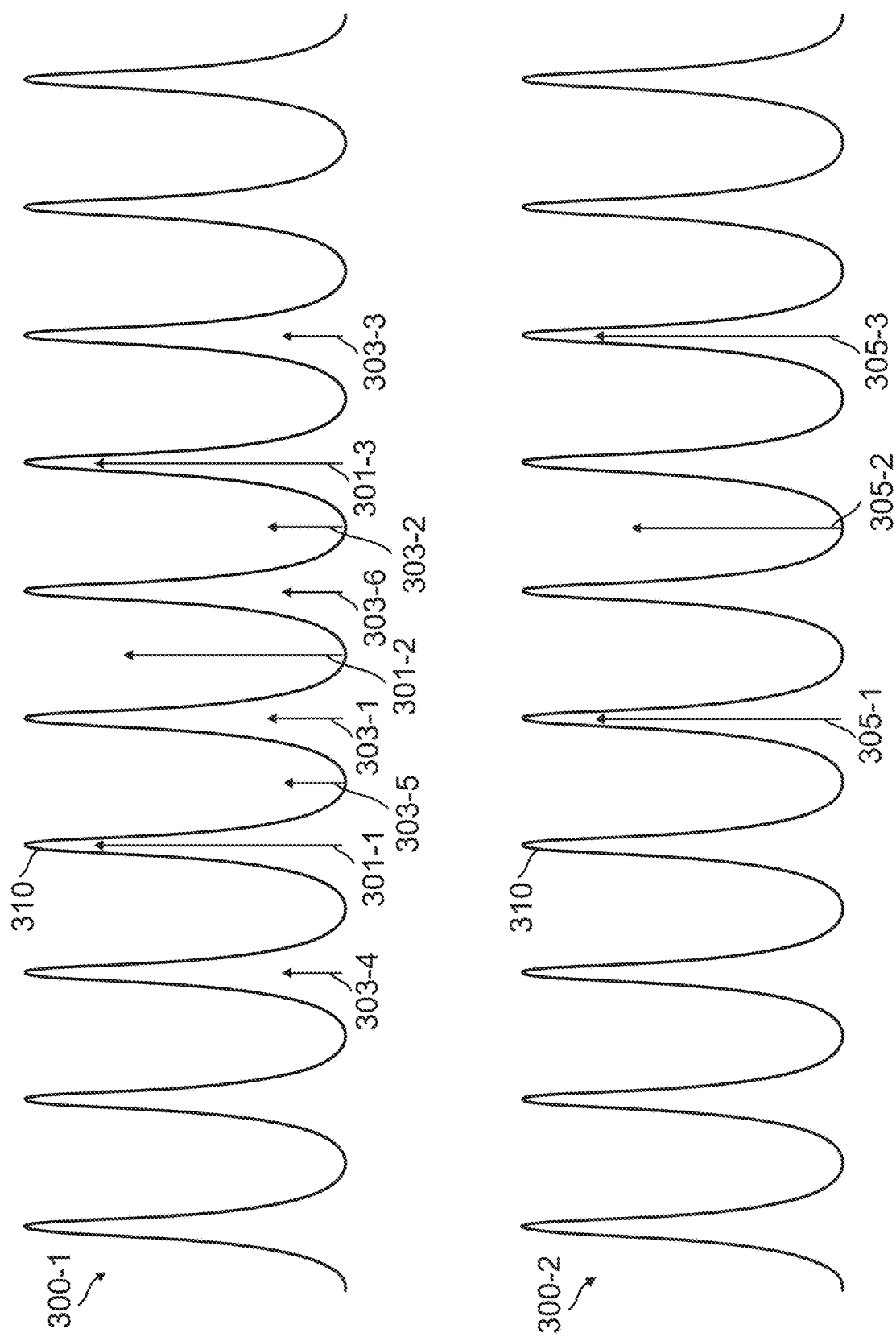
FIG. 3 is a series of graphs illustrating the effects of cross-talk and backscatter in an RFOG according to an aspect of the present disclosure.

FIG. 3 illustrates graphs 300-1 and 300-2, illustrating the respective frequency tones of the first slave laser and the second slave laser and the effect of the cross-talked tones in an RFOG such as RFOG 100 in FIG. 1. Additionally, the graphs 300-1 and 300-2 do not show all of the tones produced by the first slave laser and the second slave laser, but illustrate a sufficient number of tones to illustrate problems associated with the effects of cross-talk and backscatter in an RFOG. Additional graphs described in the present specification illustrate a sufficient number of tones to illustrate solutions to problems associated with the effects of cross-talk and backscatter in an RFOG. Additionally, tones produced by a master slave laser source are not shown in the graphs 300-1 and 300-2, or other graphs described in the present specification.

Graph 300-1 shows the CW resonance spectrum, and Graph 300-2 shows the CCW resonance spectrum of the resonator 119. For this example, the gyroscope may not experience a rotation rate along an associated sensing axis, and therefore, the CW and CCW resonance frequencies 310 may be the same for the same longitudinal resonance mode number. As shown in graph 300-1, the first slave laser may be associated with three primary frequency tones 301-1, 301-2, and 301-3 and six cross-talked tones 303-1, 303-2, 303-3, 303-4, 303-5, and 303-6 that propagate in the first direction. The cross-talked tones arise from either electrical or optical cross-talk within the MFLS 159 and backscattered light from the resonator 119. As shown in graph 300-2, the second slave laser may be associated with three primary tones 305-1, 305-2, and 305-3, which propagate in the second direction. For this example, it is assumed that the second slave laser has no cross-talk, but the systems addressing cross-talk for the first slave laser may similarly address cross-talk that arises on the second slave laser.

In certain embodiments, some of the tones are located at frequencies far from the resonance frequencies 310 of the resonator 119. For example, the primary tone 301-2 of the first slave laser, the primary tone 305-2 of the second slave laser, the cross-talked tones 303-2 and 303-5 of the first slave laser are far from resonance frequencies 310 of the resonator 119. Tones that are far from resonance frequencies 310 of the resonator 119 may not substantially propagate through the resonator 119.

In some embodiments, when a cross-talked tone (first cross-talk) for one slave laser is at the same frequency of a primary tone for the other slave laser, and there is additional optical cross-talk within the resonator (second cross-talk), such as Rayleigh scattering from the fiber, the cross-talked tone may cause errors in the measurements acquired from the RFOG 100. For example, the cross-talked tones 303-1 and 303-3 of the first slave laser are at the same frequencies as the primary tones 305-1 and 305-3 of the second slave laser. If the cross-talked tones 303-1 and 303-3 backscatter within the resonator so that a portion of the tones propagate in the same direction as the primary tones 305-1 and 305-3 of the second laser, the cross-talked tones may optically interfere with the primary tones. The optical interference may result in significant rotation sensing errors.

Figure 4:
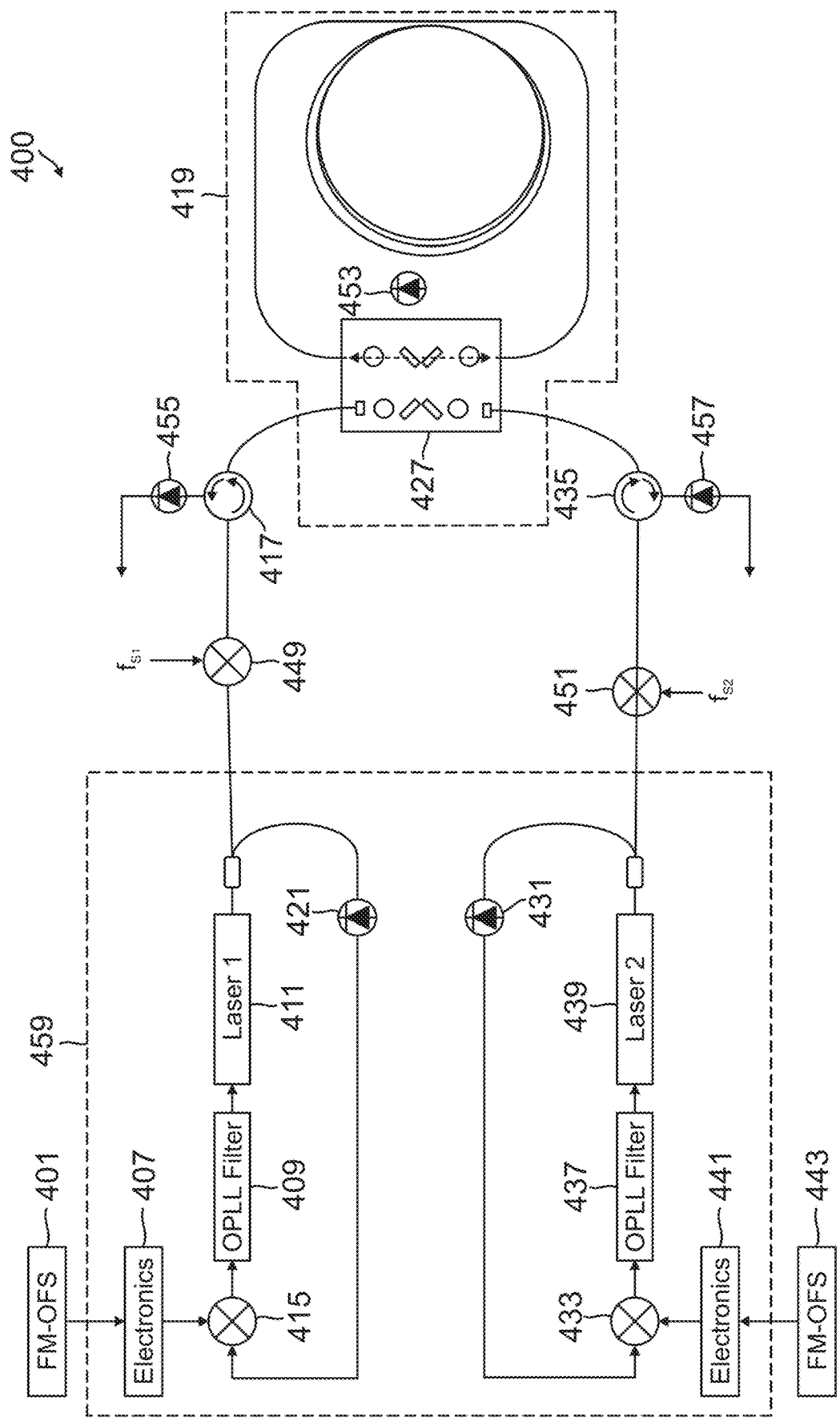
FIG. 4 is a block diagram of an RFOG implementing carrier suppression according to an aspect of the present disclosure.

FIG. 4 is a block diagram of an RFOG 400. As illustrated, elements in the RFOG 400 may be similar to elements in the RFOG 100 described above in FIG. 1. In particular, the components of the RFOG 400 labeled 4XX are substantially similar to components of the RFOG 100 labeled 1XX. For example, the resonator 419 is substantially similar to the resonator 119, the FM-OFS 401 is substantially similar to the FM-OFS 101, and so forth. However, the first laser source 411 is similar to the first slave laser source 111 and the second laser source 439 is similar to the second slave laser source 139 with the exception that light waves produced by the first laser source 411 and the second laser source 439 are not stabilized by a master laser. Also, the light waves propagating within the RFOG 400 are not modulated using common modulation or sideband heterodyning. Further, the RFOG 400 differs from the RFOG 100 in that the RFOG 400 may include carrier suppression modulators 449 and 451 for reducing interference caused by cross-talked or backscattered signals.

In certain embodiments, the carrier suppression modulators 449 and 451 may respectively modulate the light waves associated with the first laser source 411 and the light waves associated with the second laser source 439. When modulating the light waves using the carrier suppression modulators 449 and 451, the carrier suppression modulators 449 and 451 modulate the light waves after the first cross-talk occurs. Additionally, the carrier suppression modulators 449 and 451 may modulate the light waves at different frequencies $f_{S1}$ and $f_{S2}$. For example, the modulation frequency $f_{S1}$ applied by the first carrier suppression modulator 449 may be equal to 211 Hz, and the modulation frequency $f_{S2}$ applied by the second carrier suppression modulator 451 may be equal to 511 Hz. The frequencies of the carrier suppression modulation may be greater than or less than the 211 Hz and 511 Hz described above. Further, the amplitude of the modulation signal may be substantially suppressed such that the Bessel function $J_0$ approaches zero. For example, the amplitude may be substantially at 2.404 radians. The amplitude of the applied carrier suppression modulators may be at other amplitudes that also cause the Bessel function $J_0$ to substantially approach zero.

In some embodiments, the RFOG 400 may include one of the first carrier suppression modulator 449 and the second carrier suppression modulator 451. In such a system having a single carrier suppression modulator, the RFOG 400 may be able to suppress the carrier frequency of one of the light waves produced by the first laser source 411 or the second laser source 439, such that the suppressed light waves have substantially zero power at the suppressed carrier frequency. However, suppressing the carrier frequency of both light waves produced by the first laser source 411 and the second laser source 439 may lead to further suppression of errors related to cross-talk and backscatter. In some embodiments, determining whether to use one or two carrier suppression modulators may depend on the quality of components used for modulation. For example, using a lithium niobate phase modulator (silicon photonic modulator, or other similarly high-quality modulators) may be sufficient for using a single carrier suppression modulator. However, in systems using lower quality modulators, the RFOG 400 may use two carrier suppression modulators to achieve the desired outcome.

Figure 5:
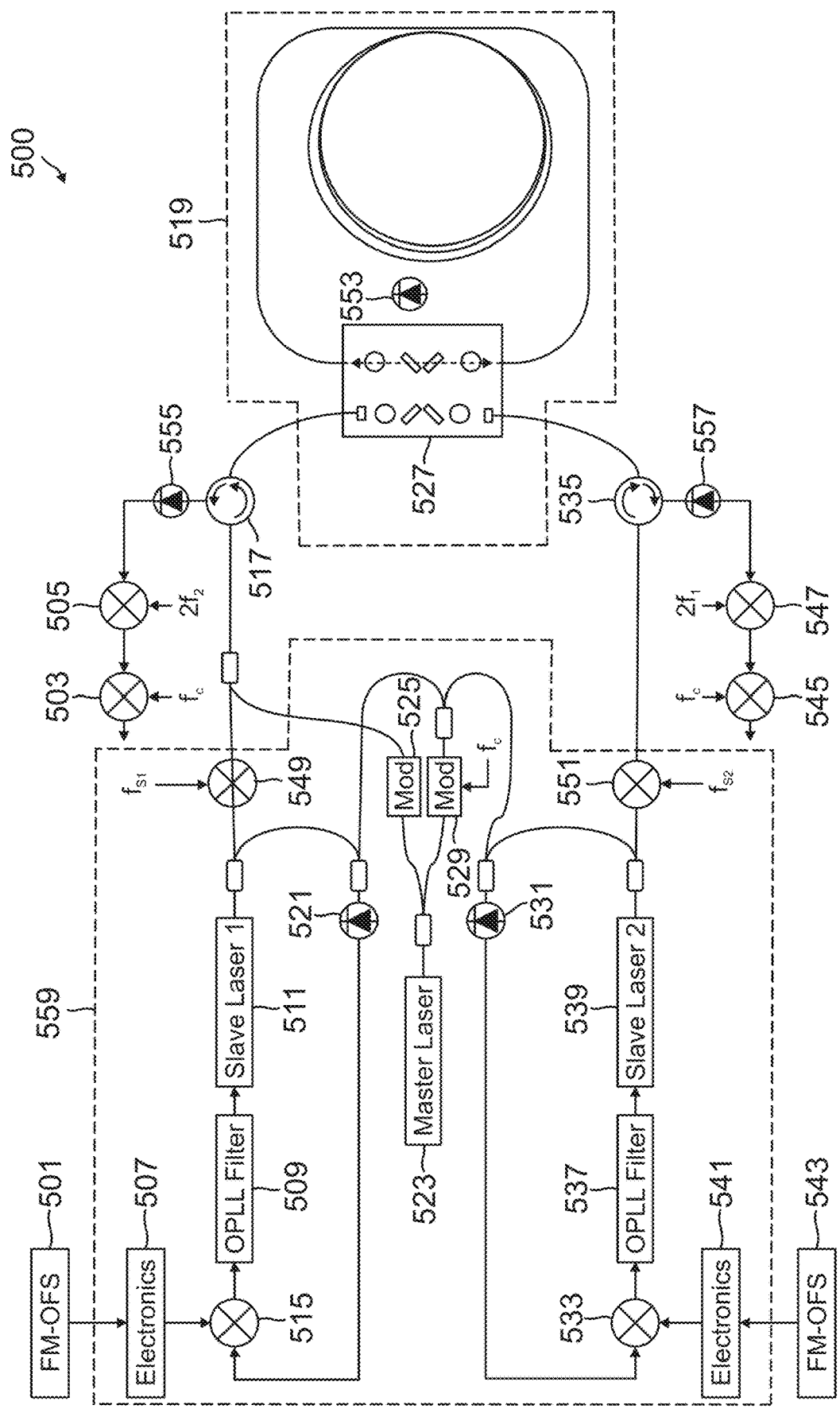
FIG. 5 is a block diagram of an RFOG implementing carrier suppression according to an aspect of the present disclosure.

FIG. 5 is a block diagram of an RFOG 500. As illustrated, elements in the RFOG 500 may be similar to elements in the RFOG 100 described above in FIG. 1 and to the elements in the RFOG 400 described above in FIG. 4. In particular, the components of the RFOG 500 labeled 5XX are substantially similar to components of the RFOG 100 labeled 1XX or RFOG 400 labeled 4XX. For example, the resonator 519 is substantially similar to the resonator 119, the first slave laser source 511 is substantially similar to the first slave laser source 111, the master laser source 523 is substantially similar to the master laser source 123, and so forth. However, the RFOG 500 differs from the RFOG 100 and the RFOG 400 in that the RFOG 500 may include a combination of the carrier suppression modulators 549 and 551 (similar to modulators 449 and 451 described in FIG. 4 and components for providing common modulation and sideband heterodyne modulation described in FIG. 1).

Figure 6:
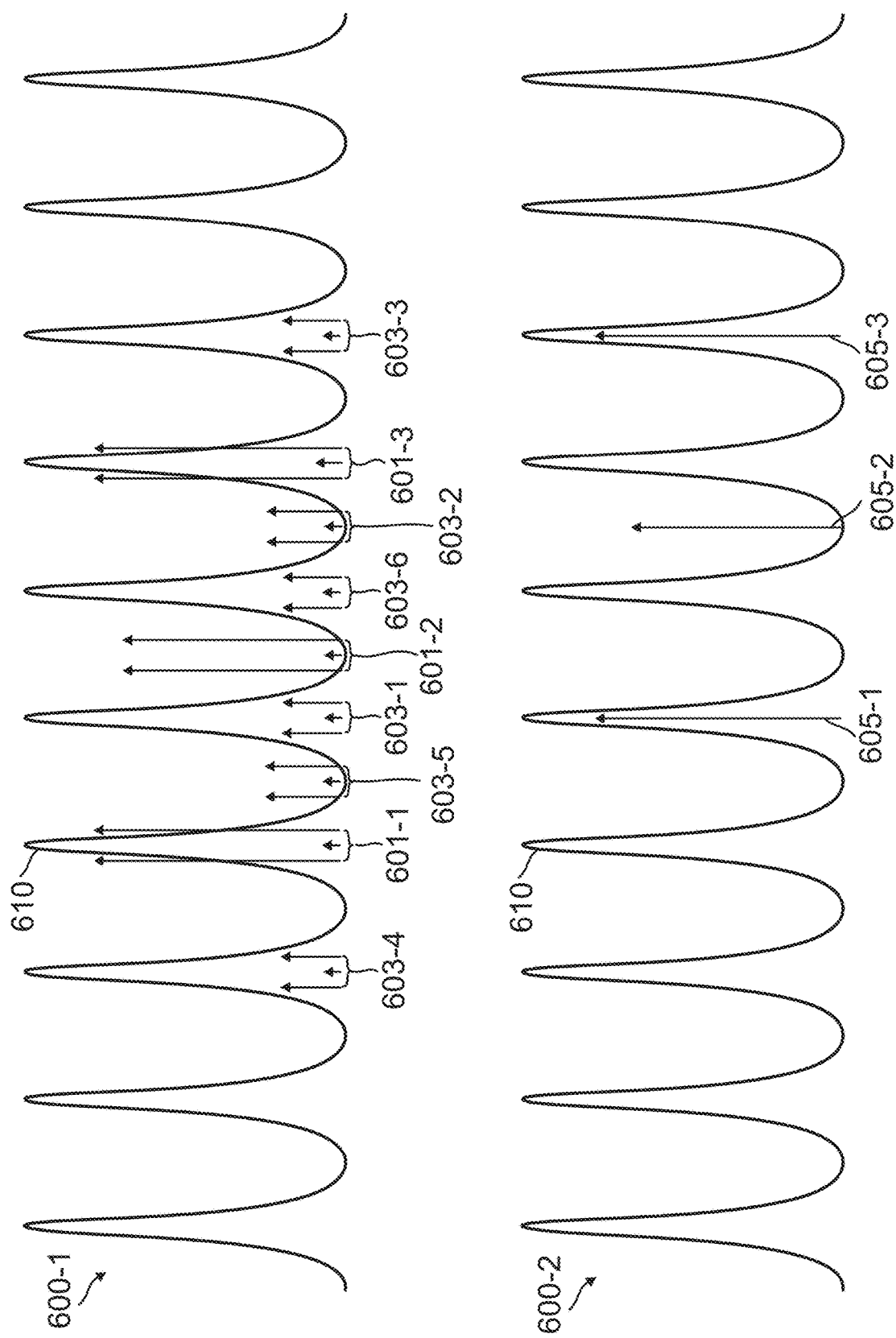
FIG. 6 is a series of graphs illustrating the effects of implementing carrier suppression on one of two slave lasers according to an aspect of the present disclosure.

FIG. 6 illustrates graphs 600-1 and 600-2 illustrating the respective frequency tones of the light waves produced by the first slave laser source 511 and the second slave laser source 539 when the light waves produced by the first slave laser source 511 are modulated using carrier suppression modulation applied in the first slave laser source 511 optical path after the first cross-talk has occurred. The graph 600-1 shows the CW resonance spectrum, and the graph 600-2 shows the CCW resonance spectrum of the resonator 519. For this example, the gyroscope may not experience a rotation rate along its sensing axis, and therefore the CW and CCW resonance frequencies 610 are the same for the same resonance mode number. As shown in graph 600-1, the light waves produced by the first slave laser source 511 include the carrier and first-order sidebands of the three primary frequency tones 601-1, 601-2, and 601-3 and six cross-talked tones 603-1, 603-2, 603-3, 603-4, 603-5, and 603-6, that propagate in a first direction. The cross-talked tones may arise from either electrical or optical cross-talk within the MFLS 559. As shown in graph 600-2, the light waves produced by the second slave laser source 539 may include three primary tones 605-1, 605-2, and 605-3 that propagate in the second direction. For this example, it is assumed that the second slave laser has no cross-talk tones, but the invention would work equally as well if the second laser had cross-talk tones.

In certain embodiments, some of the tones are located at frequencies that are far from resonance frequencies 610 of the resonator 519. For example, the primary tones 601-2 of the first slave laser, the primary tones 605-2 of the second slave laser, the cross-talked tones 603-2 and 603-5 of the first slave laser are far from the resonance frequencies 610. Tones that are far from resonance frequencies 610 do not substantially propagate through the resonator 519.

In some embodiments, when a cross-talked tone for one slave laser is at the same frequency of a primary tone for the other slave laser, and there is additional optical cross-talk within the resonator 519, such as Rayleigh scattering from the fiber, the cross-talked tone may cause errors in the measurements acquired from the RFOG 500. For example, the carriers of cross-talked tones 603-1 and 603-3 of the first slave laser are at the same frequencies as the primary tones 605-1 and 605-3 of the second slave laser. If the cross-talked tones 603-1 and 603-3 backscatter within the resonator so that a portion of the tones propagate in the same direction as the primary tones 605-1 and 605-3 of the second laser, the cross-talked tones will optically interfere with the primary tones. The optical interference may result in large rotation sensing errors.

By suppressing the carrier frequencies of a first light wave, the interference of the carriers of the cross-talked tones 603-1 and 603-3 with the primary tones 605-1 and 605-3 may be reduced. Thus, errors caused by cross-talked tones may also be reduced. Furthermore, the carrier suppression creates sideband tones about the carriers of the cross-talked tones 603-1 and 603-3. These sideband tones may also interfere with the primary tones 605-1 and 605-3, but the resulting rotation sensing error will be at a frequency equal to the carrier suppression frequency. As long as the carrier suppression frequency is adequately high, the resulting measurement error can be filtered out. Additionally, to detect rotation of the RFOG 500 based on the modulated first light wave, the RFOG 500 may detect the signals located at the harmonic signals of the first light wave about the carrier signal.

Figure 7:
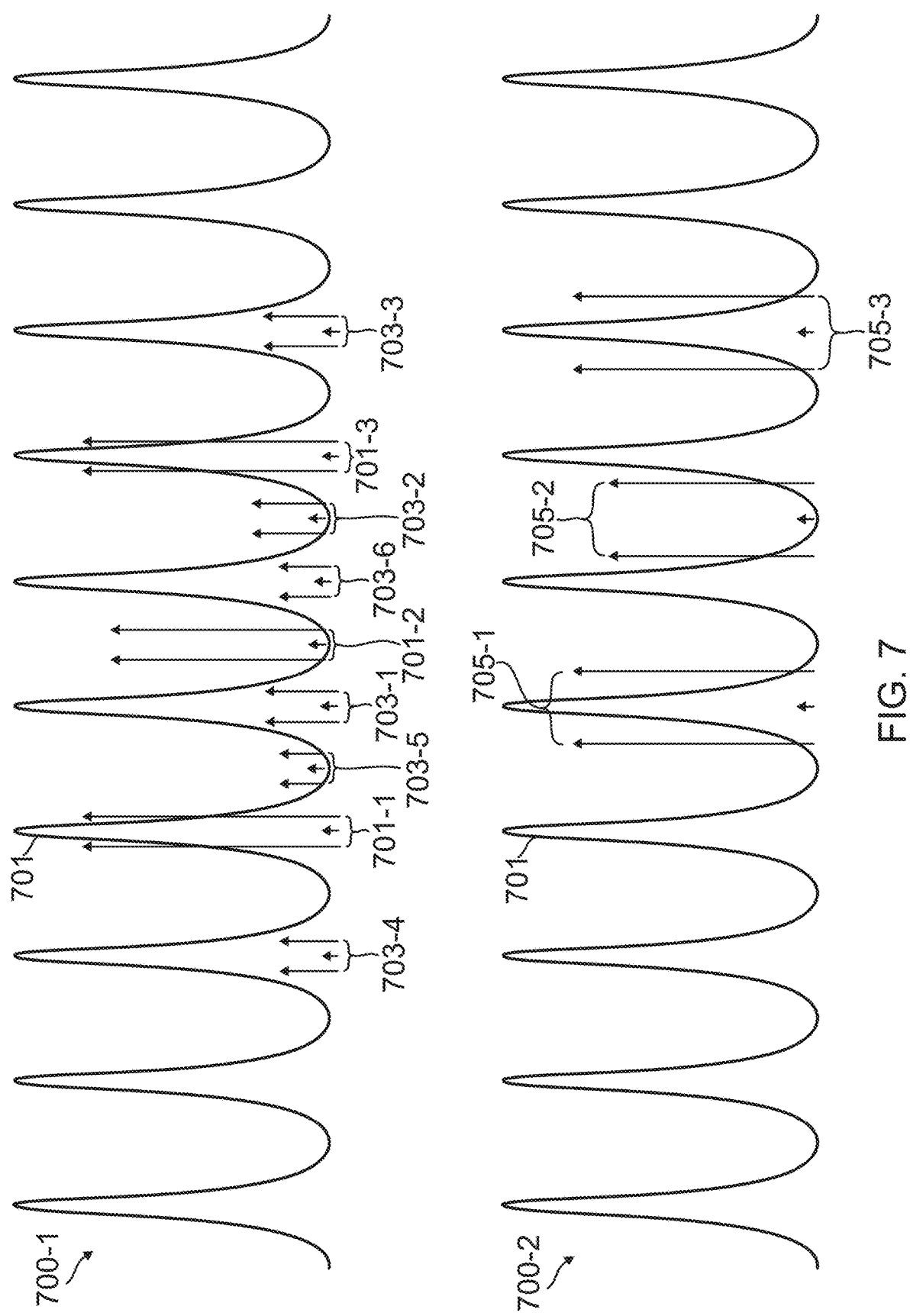
FIG. 7 is a series of graphs illustrating the effects of implementing carrier suppression on two slave lasers according to an aspect of the present disclosure.

FIG. 7 illustrates graphs 700-1 and 700-2 illustrating the respective frequency tones of the light waves produced by the first slave laser source 511 and the second slave laser source 539 when the light waves produced by the first slave laser source 511 and the second slave laser source 539 are both modulated using carrier suppression modulation. The graph 700-1 shows the CW resonance spectrum, and the graph 700-2 shows the CCW resonance spectrum of the resonator 519. As shown in the graph 700-1, the light waves produced by the first slave laser source 511 may include the carrier and first-order sidebands of the three primary tones 701-1, 701-2, and 701-3 and the carrier and first-order sidebands of the six cross-talked tones 703-1, 703-2, 703-3, 703-4, 703-5, and 703-6 propagating in the first direction. The cross-talked tones arise from either electrical or optical cross-talk within the MFLS 559. Electrical cross-talk occurs when electrical signals within the MFLS affect the light produced by the first slave laser source 511 and the second slave laser source 539. Optical cross-talk occurs when optical components backscatter light in the wrong direction or couple light into unintended optical paths within the RFOG 500. Tones produced by the master laser source 523 are not shown in FIG. 7. The sideband tones may be generated by the carrier suppression. As shown in graph 700-2, the light waves produced by the second slave laser source 539 may include carrier and modulation sidebands of three primary tones 705-1, 705-2, and 705-3. The carrier and sideband primary tones 705-1, 705-2, and 705-3 propagate in the second direction. The sideband tones may be produced by the second carrier suppression.

In certain embodiments, some of the tones are located at frequencies that are far from resonance frequencies 710 of resonator 519. For example, the primary tones 701-2 of the light waves produced by the first slave laser source 511, the primary tones 705-2 of the light waves produced by the second slave laser source 539, the cross-talked tones 703-2 and 703-5 of the light waves produced by the first slave laser source 511 are far from resonance frequencies 710 of the resonator 519. Tones that are far from resonance frequencies 710 do not substantially propagate through the resonator 519.

In some embodiments, to avoid a cross-talked tone for light waves produced by one slave laser source from being at the same frequency of a primary tone for a light wave produced by the other slave lasers source, the light waves from both of the slave laser sources may be modulated with a carrier suppression modulation substantially as described above in connection with the first carrier suppression modulator 549 and the second carrier suppression modulator 551. As described above, the first carrier suppression modulator 549 may modulate the first light waves by a carrier suppression modulation frequency that causes the first light waves to have tones at frequencies equal to multiples of the first carrier suppression modulation frequency away from the carrier frequencies of the first light waves. Also, the second carrier suppression modulator 551 may modulate the second light waves by a second carrier suppression modulation frequency that is different from the first carrier suppression modulation frequency. The modulation by the second carrier suppression modulator 551 second carrier suppression modulator 551 second carrier suppression modulator 551 may cause the second light waves to have tones at frequencies equal to multiples of the second carrier suppression modulation frequency away from the carrier frequencies of the second light waves. While graph 700-1 only shows the modulated signals that are closest in frequency to the carrier frequency, there are additional signals at harmonics of the carrier suppression modulation frequency.

By suppressing the carrier frequencies of the first light wave and the second light wave, the interference of the cross-talked tones 703-1 and 703-3 with the primary tones 705-1 and 705-3 is reduced. Thus, errors caused by cross-talked tones may also be reduced. Additionally, to detect rotation of the RFOG 500 based on the modulated first light wave, the RFOG 500 may detect the signals located at the harmonic signals of the first light wave about the carrier signal.

Figure 8:
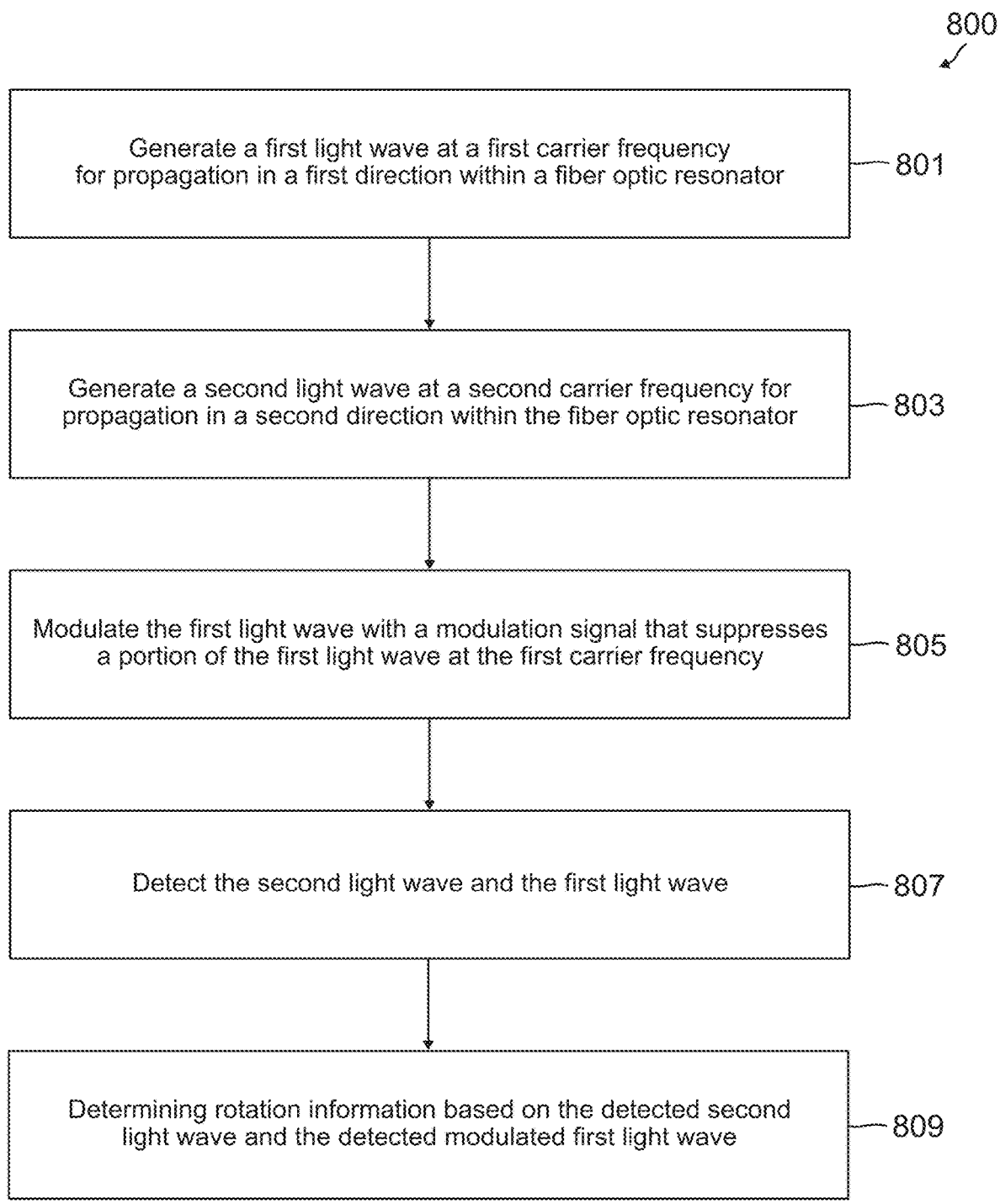
FIG. 8 is a flowchart diagram illustrating a method for implementing carrier suppression within an RFOG according to an aspect of the present disclosure.

FIG. 8 is a flowchart diagram illustrating a method 800 for implementing carrier suppression within an RFOG. The method 800 begins at 801, where a first light wave is generated at a first carrier frequency for propagation in a first direction within a fiber optic resonator. The method 800 proceeds at 803, where a second light wave is generated at a second carrier frequency for propagation in a second direction within the fiber optic resonator. For example, a first slave laser source may generate the first light waves for propagation in a CW direction through a fiber optic resonator, and a second slave laser source may generate the second light waves for propagation in a CCW direction through the fiber optic resonator.

In further embodiments, the method 800 proceeds at 805, where the first light wave is modulated with a modulation signal that suppresses a portion of the first light wave at the first carrier frequency. Also, the method 800 proceeds at 807, where the second light wave and the first light wave are detected. Additionally, the method 800 proceeds at 809, where rotation information is determined based on the detected second light wave and the detected modulated first light wave.

EXAMPLE EMBODIMENTS

Example 1 includes a resonator fiber optic gyroscope (RFOG) comprising: a fiber optic resonator; a first laser source that produces a first light wave at a first carrier frequency and a first cross-talked portion at a second carrier frequency wave for propagating within the fiber optic resonator in a first direction, wherein a second cross-talked portion propagates in a second direction that is opposite to the first direction; a second laser source that produces a second light wave for propagating within the fiber optic resonator in the second direction at a second carrier frequency, and having a third cross-talked portion that propagates in the first direction; a first modulator that modulates the first light wave by suppressing light at the first carrier frequency and the second cross-talked portion at the second carrier frequency; and one or more photodetectors that generate a carrier suppressed first signal from the modulated first light wave and a second signal from the second light wave.

Example 2 includes the RFOG of Example 1, wherein the first modulator modulates with a first modulation signal that causes substantial suppression of the first light wave at the first carrier frequency (Bessel function $J_0$ to approach zero).

Example 3 includes the RFOG of any of Examples 1-2, further comprising a second modulator that modulates the second light wave by suppressing light at the first carrier frequency and the second cross-talked portion at the second carrier frequency.

Example 4 includes the RFOG of Example 3, wherein the first carrier suppression frequency and the second carrier suppression frequency are different.

Example 5 includes the RFOG of any of Examples 1-4, further comprising: a first sideband heterodyne modulator that modulates the first light wave with a first sideband signal having a first sideband heterodyne modulation frequency; a second sideband heterodyne modulator that modulates the second light wave with a second sideband signal having a second sideband heterodyne modulation frequency; a first sideband heterodyne demodulator that demodulates the carrier suppressed first signal by a first sideband demodulation signal at twice the first sideband heterodyne modulation frequency; and a second sideband heterodyne demodulator that demodulates the second signal by a second sideband demodulation signal at twice the second sideband heterodyne modulation frequency.

Example 6 includes the RFOG of any of Examples 1-5, further comprising: a master laser source that provides a master light wave that stabilizes the first carrier frequency and the second carrier frequency; one or more common modulators to modulate both the first light wave and the second light wave with a common modulation frequency signal; and one or more common demodulators that demodulate the carrier suppressed first signal and the second signal by the common modulation frequency signal.

Example 7 includes the RFOG of any of Examples 1-6, further comprising an interface that provides the carrier suppressed first signal and the second signal to one or more processors.

Example 8 includes the RFOG of any of Examples 1-7, wherein the first laser source and the second laser source are provided by a multi-frequency laser source.

Example 9 includes the RFOG of any of Examples 1-8, wherein at least a portion of the RFOG is fabricated on a silicon optical bench.

Example 10 includes the RFOG of any of Examples 1-9, wherein the first modulator is at least one of: a lithium niobate modulator; and a silicon photonic modulator.

Example 11 includes a method comprising: generating a first light wave at a first carrier frequency and a first cross-talked portion at a second carrier frequency for propagation in a first direction within a fiber optic resonator, wherein a second cross-talked portion propagates in a second direction that is opposite to the first direction; generating a second light wave at a second carrier frequency for propagation in the second direction within the fiber optic resonator, wherein a third cross-talked portion propagates in the first direction; modulating the first light wave as generated with a first modulation signal that suppresses light at the first carrier frequency and the second cross-talked portion at the second carrier frequency; detecting the second light wave and the modulated first light wave; and determining rotation information based on the detected second light wave and the detected modulated first light wave.

Example 12 includes the method of Example 11, wherein an amplitude of the first modulation signal causes substantial suppression of the first light wave at the first carrier frequency (Bessel function $J_0$ to approach zero).

Example 13 includes the method of any of Examples 11-12, further comprising modulating the second light wave with a second modulation signal that substantially suppresses light at the first carrier frequency and the second cross-talked portion at the second carrier frequency.

Example 14 includes the method of Example 13, wherein the first modulation signal and the second modulation signal have different frequencies.

Example 15 includes the method of any of Examples 11-14, further comprising: modulating the first light wave by a first sideband signal having a first sideband heterodyne modulation frequency; modulating the second light wave by a second sideband signal having a second sideband heterodyne modulation frequency; demodulating the detected modulated first light wave by a first sideband demodulation signal at twice the first sideband heterodyne modulation frequency; and demodulating the detected second light wave by a second sideband demodulation signal at twice the second sideband heterodyne modulation frequency.

Example 16 includes the method of any of Examples 11-15, further comprising: stabilizing the first carrier frequency and the second carrier frequency using a master light wave produced by a master laser source; modulating both the first light wave and the second light wave with a common modulation frequency signal; and demodulating the detected modulated first light wave and the detected second light wave by the common modulation frequency signal.

Example 17 includes the method of any of Examples 11-16, further comprising providing rotation information based on the detected modulated first light wave and the detected second light wave to a computational device.

Example 18 includes a system comprising: a fiber optic resonator; a plurality of laser sources that provide light waves for propagation within the fiber optic resonator, wherein a first light wave at a first carrier frequency, a first cross-talked portion at a second carrier frequency, and a third cross-talked portion propagate in a first direction through the fiber optic resonator and a second light wave at the second carrier frequency and a second cross-talked portion propagate in a second direction through the fiber optic resonator, wherein the second direction is opposite to the first direction; one or more modulators that modulate at least one of the first light wave and the second light wave by suppressing light at the first carrier frequency, the second cross-talked portion at the second carrier frequency; one or more photodetectors that produce at least one electrical signal from detecting the first light wave and the second light wave; and one or more processors that receive the at least one electrical signal from the one or more photodetectors and calculates navigation information based on information in the at least one electrical signal.

Example 19 includes the system of Example 18, wherein the one or more modulators modulates both the first light wave and the second light wave by different frequencies.

Example 20 includes the system of any of Examples 18-19, further comprising: a master laser source that provides a master light wave that stabilizes the carrier frequencies of the first light wave and the second light wave; one or more common modulators to modulate both the first light wave and the second light wave with a common modulation frequency signal; and one or more common demodulators that demodulate the first light wave and the second light wave where at least one of the first light wave and the second light wave has zero power at the suppressed carrier frequency.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope (RFOG) comprising:
   a fiber optic resonator;
   a first laser source that produces a first light wave at a first carrier frequency and a first cross-talked portion at a second carrier frequency wave for propagating within the fiber optic resonator in a first direction, wherein a second cross-talked portion propagates in a second direction that is opposite to the first direction;
   a second laser source that produces a second light wave for propagating within the fiber optic resonator in the second direction at a second carrier frequency, and having a third cross-talked portion that propagates in the first direction;
   a first modulator that modulates the first light wave by suppressing light at the first carrier frequency and the second cross-talked portion at the second carrier frequency; and
   one or more photodetectors that generate a carrier suppressed first signal from the modulated first light wave and a second signal from the second light wave.

2. The RFOG of claim 1, wherein the first modulator modulates with a first modulation signal that causes substantial suppression of the first light wave at the first carrier frequency.

3. The RFOG of claim 1, further comprising a second modulator that modulates the second light wave by suppressing light at the first carrier frequency and the second cross-talked portion at the second carrier frequency.

4. The RFOG of claim 3, wherein the first carrier suppression frequency and the second carrier suppression frequency are different.

5. The RFOG of claim 1, further comprising:
a first sideband heterodyne modulator that modulates the first light wave with a first sideband signal having a first sideband heterodyne modulation frequency;
a second sideband heterodyne modulator that modulates the second light wave with a second sideband signal having a second sideband heterodyne modulation frequency;
a first sideband heterodyne demodulator that demodulates the carrier suppressed first signal by a first sideband demodulation signal at twice the first sideband heterodyne modulation frequency; and
a second sideband heterodyne demodulator that demodulates the second signal by a second sideband demodulation signal at twice the second sideband heterodyne modulation frequency.

6. The RFOG of claim 1, further comprising:
a master laser source that provides a master light wave that stabilizes the first carrier frequency and the second carrier frequency;
one or more common modulators to modulate both the first light wave and the second light wave with a common modulation frequency signal; and
one or more common demodulators that demodulate the carrier suppressed first signal and the second signal by the common modulation frequency signal.

7. The RFOG of claim 1, further comprising an interface that provides the carrier suppressed first signal and the second signal to one or more processors.

8. The RFOG of claim 1, wherein the first laser source and the second laser source are provided by a multi-frequency laser source.

9. The RFOG of claim 1, wherein at least a portion of the RFOG is fabricated on a silicon optical bench.

10. The RFOG of claim 1, wherein the first modulator is at least one of:
a lithium niobate modulator; and
a silicon photonic modulator.

11. A method comprising:
generating a first light wave at a first carrier frequency and a first cross-talked portion at a second carrier frequency for propagation in a first direction within a fiber optic resonator, wherein a second cross-talked portion propagates in a second direction that is opposite to the first direction;
generating a second light wave at a second carrier frequency for propagation in the second direction within the fiber optic resonator, wherein a third cross-talked portion propagates in the first direction;
modulating the first light wave as generated with a first modulation signal that suppresses light at the first carrier frequency and the second cross-talked portion at the second carrier frequency;
detecting the second light wave and the modulated first light wave; and
determining rotation information based on the detected second light wave and the detected modulated first light wave.

12. The method of claim 11, wherein an amplitude of the first modulation signal causes substantial suppression of the first light wave at the first carrier frequency.

13. The method of claim 11, further comprising modulating the second light wave with a second modulation signal that substantially suppresses light at the first carrier frequency and the second cross-talked portion at the second carrier frequency.

14. The method of claim 13, wherein the first modulation signal and the second modulation signal have different frequencies.

15. The method of claim 11, further comprising:
modulating the first light wave by a first sideband signal having a first sideband heterodyne modulation frequency;
modulating the second light wave by a second sideband signal having a second sideband heterodyne modulation frequency;
demodulating the detected modulated first light wave by a first sideband demodulation signal at twice the first sideband heterodyne modulation frequency; and
demodulating the detected second light wave by a second sideband demodulation signal at twice the second sideband heterodyne modulation frequency.

16. The method of claim 11, further comprising:
stabilizing the first carrier frequency and the second carrier frequency using a master light wave produced by a master laser source;
modulating both the first light wave and the second light wave with a common modulation frequency signal; and
demodulating the detected modulated first light wave and the detected second light wave by the common modulation frequency signal.

17. The method of claim 11, further comprising providing rotation information based on the detected modulated first light wave and the detected second light wave to a computational device.

18. A system comprising:
a fiber optic resonator;
a plurality of laser sources that provide light waves for propagation within the fiber optic resonator, wherein a first light wave at a first carrier frequency, a first cross-talked portion at a second carrier frequency, and a third cross-talked portion propagate in a first direction through the fiber optic resonator and a second light wave at the second carrier frequency and a second cross-talked portion propagate in a second direction through the fiber optic resonator, wherein the second direction is opposite the first direction;
one or more modulators that modulate at least one of the first light wave and the second light wave by suppressing light at the first carrier frequency and the second cross-talked portion at the second carrier frequency;
one or more photodetectors that produce at least one electrical signal from detecting the first light wave and the second light wave; and
one or more processors that receive the at least one electrical signal from the one or more photodetectors and calculates navigation information based on information in the at least one electrical signal.

19. The system of claim 18, wherein the one or more modulators modulates both the first light wave and the second light wave by different frequencies.

20. The system of claim 18, further comprising:
a master laser source that provides a master light wave that stabilizes the carrier frequencies of the first light wave and the second light wave;
one or more common modulators to modulate both the first light wave and the second light wave with a common modulation frequency signal; and
one or more common demodulators that demodulate the first light wave and the second light wave where at least one of the first light wave and the second light wave has zero power at the suppressed carrier frequency.

* * * * *